US012461883B2

(12) United States Patent
Lu (10) Patent No.: US 12,461,883 B2
(45) Date of Patent: Nov. 4, 2025

(54) METHOD, APPARATUS, TERMINAL DEVICE AND MEDIUM FOR REALIZING OTG COMMUNICATION WITHOUT PLUGGING AND UNPLUGGING

(71) Applicant: FEITIAN TECHNOLOGIES CO., LTD., Beijing (CN)

(72) Inventor: Zhou Lu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 18/293,794

(22) PCT Filed: May 18, 2023

(86) PCT No.: PCT/CN2023/094944
§ 371 (c)(1),
(2) Date: Jan. 31, 2024

(87) PCT Pub. No.: WO2024/016810
PCT Pub. Date: Jan. 25, 2024

(65) Prior Publication Data
US 2024/0248868 A1 Jul. 25, 2024

(30) Foreign Application Priority Data
Jul. 21, 2022 (CN) .......................... 202210857314.8

(51) Int. Cl.
*G06F 13/42* (2006.01)
*G06F 13/38* (2006.01)

(52) U.S. Cl.
CPC ........ *G06F 13/4282* (2013.01); *G06F 13/382* (2013.01); *G06F 2213/0042* (2013.01)

(58) Field of Classification Search
CPC ............... G06F 13/4282; G06F 13/382; G06F 2213/0042
See application file for complete search history.

(56) References Cited

U.S. PATENT DOCUMENTS 11,526,339 B1 * 12/2022 Kruayatidee ....... H04L 63/0853
2004/0225836 A1 * 11/2004 Lin .................. G06K 19/07732
711/115

(Continued)

*Primary Examiner* — Henry Tsai
*Assistant Examiner* — Harry Z Wang
(74) *Attorney, Agent, or Firm* — J. Clinton Wimbish; Maynard Nexsen PC (57) ABSTRACT

A method for realizing OTG communication without plugging and unplugging includes: when an apk file of an application is generated, the application presets device information of an associated USB device; when the USB device is connected to a terminal device, a system of the terminal device recognizes an application qualified for initiation according to the device information of the connected USB device; a target application is initiated according to the application qualified for initiation and a user selection result; and the target application initiates a processing thread so as to establish OTG data communication with the connected USB device. The present disclosure realizes that after the USB device is plugged, the corresponding target application on the terminal device is initiated, and the terminal device and the USB device can directly perform OTG communication without the need of hardware connection of the USB device with the terminal device again, thereby avoiding the processing of manually selecting the target application, improving the initiation efficiency, and improving the usage feeling of the user. The disclosure also relates to an apparatus, terminal device and medium for realizing OTG communication without plugging and unplugging.

12 Claims, 4 Drawing Sheets

(56) References Cited

U.S. PATENT DOCUMENTS

| | | | |
|---|---|---|---|
| 2006/0236364 A1* | 10/2006 | Suni | G06F 21/604 |
| | | | 726/1 |
| 2010/0115201 A1* | 5/2010 | Hsu | G06F 21/85 |
| | | | 711/E12.001 |
| 2013/0135266 A1* | 5/2013 | Wen | G06F 3/0605 |
| | | | 345/204 |
| 2016/0164920 A1* | 6/2016 | Borovoy | G06F 21/44 |
| | | | 726/1 |
| 2019/0042805 A1* | 2/2019 | Desai | G06F 21/57 |
| 2020/0333863 A1 | 10/2020 | Yu et al. | |

* cited by examiner

METHOD, APPARATUS, TERMINAL DEVICE AND MEDIUM FOR REALIZING OTG COMMUNICATION WITHOUT PLUGGING AND UNPLUGGING

FIELD OF THE INVENTION

The present disclosure relates to a method, apparatus, terminal device and medium for realizing OTG communication without plugging and unplugging, and belongs to the field of computer technology.

PRIOR ART

With the continuous development of science and technology, there are many applications on the terminal device, some of which need special protection or special application. Now, when an access terminal such as a USB flash disk, a keyboard and a printer is connected with the terminal device through an OTG data line, a user needs to find the corresponding application on the terminal device and initiate the application by clicking. After the application is initiated, if the application and the access terminal need OTG data communication, the terminal device can recognize the access terminal and then establish OTG data communication only after the access terminal is in hardware connection with the system through the OTG data line again.

SUMMARY OF THE INVENTION

An objective of the present disclosure is to provide a method, apparatus, terminal device and medium for realizing OTG communication without plugging and unplugging (i.e., in a plug-and-play manner). After the USB device is plugged, the corresponding target application on the terminal device is initiated, and the terminal device and the USB device can directly perform OTG communication without the need of hardware connection of the USB device with the terminal device again, thereby avoiding the processing of manually selecting the target application, improving the initiation efficiency, and improving the usage feeling of the user.

To this end, according to a first aspect of the present disclosure, there is provided a method for realizing OTG communication without plugging and unplugging, including:

when an apk file of an application is generated, presetting, by the application, device information of an associated USB device through an intent filter and metadata;

when the application is installed on a terminal device, storing, by a system of the terminal device, the intent filter and metadata of the application into node information of a set object, in which the set object is a value in a key-value pair corresponding to the apk file of the application; when the USB device is connected to the terminal device, traversing, by the system of the terminal device, the set object in the system according to the device information of the USB device to recognize an application qualified for initiation; determining a target application corresponding to the USB device according to the application qualified for initiation and a user selection result, and initiating the target application; and after the target application is initiated, initiating a processing thread; acquiring, by the processing thread, the device information of the connected USB device through an object of a USB management class; and establishing OTG data communication between the target application and the connected USB device based on the device information of the connected USB device.

According to a second aspect of the present disclosure, there is provided an apparatus for realizing OTG communication without plugging and unplugging, including:

a first processing module, configured to, when an apk file of an application is generated, preset, by the application, device information of an associated USB device through an intent filter and metadata;

a second processing module, configured to, when the application is installed on a terminal device, store, by a system of the terminal device, the intent filter and metadata of the application into node information of a set object, the set object being a value in a key-value pair corresponding to the apk file of the application, and when the USB device is connected to the terminal device, traverse, by the system of the terminal device, the set object in the system according to the device information of the USB device to recognize an application qualified for initiation, determine a target application corresponding to the USB device according to the application qualified for initiation and a user selection result, and initiate the target application; and a third processing module, configured to, after the target application is initiated, initiate a processing thread, acquire, by the processing thread, the device information of the connected USB device through an object of a USB management class, and establish OTG data communication between the target application and the connected USB device based on the device information of the connected USB device.

According to a third aspect of the present disclosure, there is provided a terminal device including: a processor and a memory;

the memory is configured to store a computer program; and the processor is configured to perform the method for realizing OTG communication without plugging and unplugging in the first aspect by calling the computer program.

According to a fourth aspect of the present disclosure, there is provided a computer-readable storage medium, the computer-readable storage medium is configured to store a computer program which, when running on a computer, enables the computer to perform the method for realizing OTG communication without plugging and unplugging in the first aspect.

According to the present disclosure, there is provided a method for realizing OTG communication without plugging and unplugging, which realizes that a target application, corresponding to the USB device, on a terminal device is initiated after the USB device is connected to the terminal device.

According to the present disclosure, the terminal device and the USB device can directly perform OTG data communication without the need of hardware connection of the USB device with the terminal device again.

According to the present disclosure, the processing of manually selecting the target application is avoided, the application initiation efficiency is improved, and the usage feeling of the user is improved.

BRIEF DESCRIPTION OF THE DRAWINGS

To illustrate the technical solutions in the embodiments of the present disclosure or the prior art more clearly, the drawings required to be used in the description of the embodiments or the prior art will be briefly introduced below. Obviously, the drawings in the description below are only some embodiments of the present disclosure, and those of ordinary skill in the art may obtain other drawings according to these drawings, without paying creative efforts.

DETAILED DESCRIPTION OF EMBODIMENTS

The present disclosure proposes a method, apparatus, terminal device and medium for realizing OTG communication without plugging and unplugging, and the specific implementation manners of the present disclosure will be described in detail below with reference to the drawings.

The embodiments of the disclosure will be further described in details as below. Examples of the embodiments are shown in drawings, in which same or similar reference numbers always represent same or similar elements or elements with same or similar functions. The embodiments described with reference to the drawings are exemplary, just used for explaining the disclosure, not for limiting the disclosure.

Those skilled in the art may understand that "a", "an", "said" and "this" may also refer to plural nouns, unless otherwise specifically stated. It should be further understood that, phraseology "include" used in the specification of the disclosure refers to the presence of the characteristics, integers, steps, operations, elements and/or components, but not exclusive of the presence or addition of one or more other characters, integers, steps, operations, elements, components and/or groups thereof. It should be understood that when we mention that an element is "connected" or "coupled" to another element, it may be directly connected or coupled to the other elements, or intermediate elements may be available. In addition, "connection" or "coupling" used herein may include wireless connection or coupling. The phraseology "and/or" includes any one unit and all combinations of one or more associated listed items.

Unless otherwise defined, all terms (including technical and scientific terms) used herein have the same meaning as commonly understood by one of ordinary skill in the art to which the present disclosure belongs. It shall be further understood that terms, such as those defined in commonly used dictionaries, should be interpreted as having a meaning that is consistent with their meaning in the context of the relevant art and will not be interpreted in an idealized or overly formal sense unless expressly so defined herein.

In order to make the objectives, technical solutions, and advantages of the present disclosure clearer, the implementation manners of the present disclosure will be further described in detail below in conjunction with the accompanying drawings. The following specific embodiments may be combined, and same or similar concepts or processes may not be repeated in some embodiments.

Figure 1:
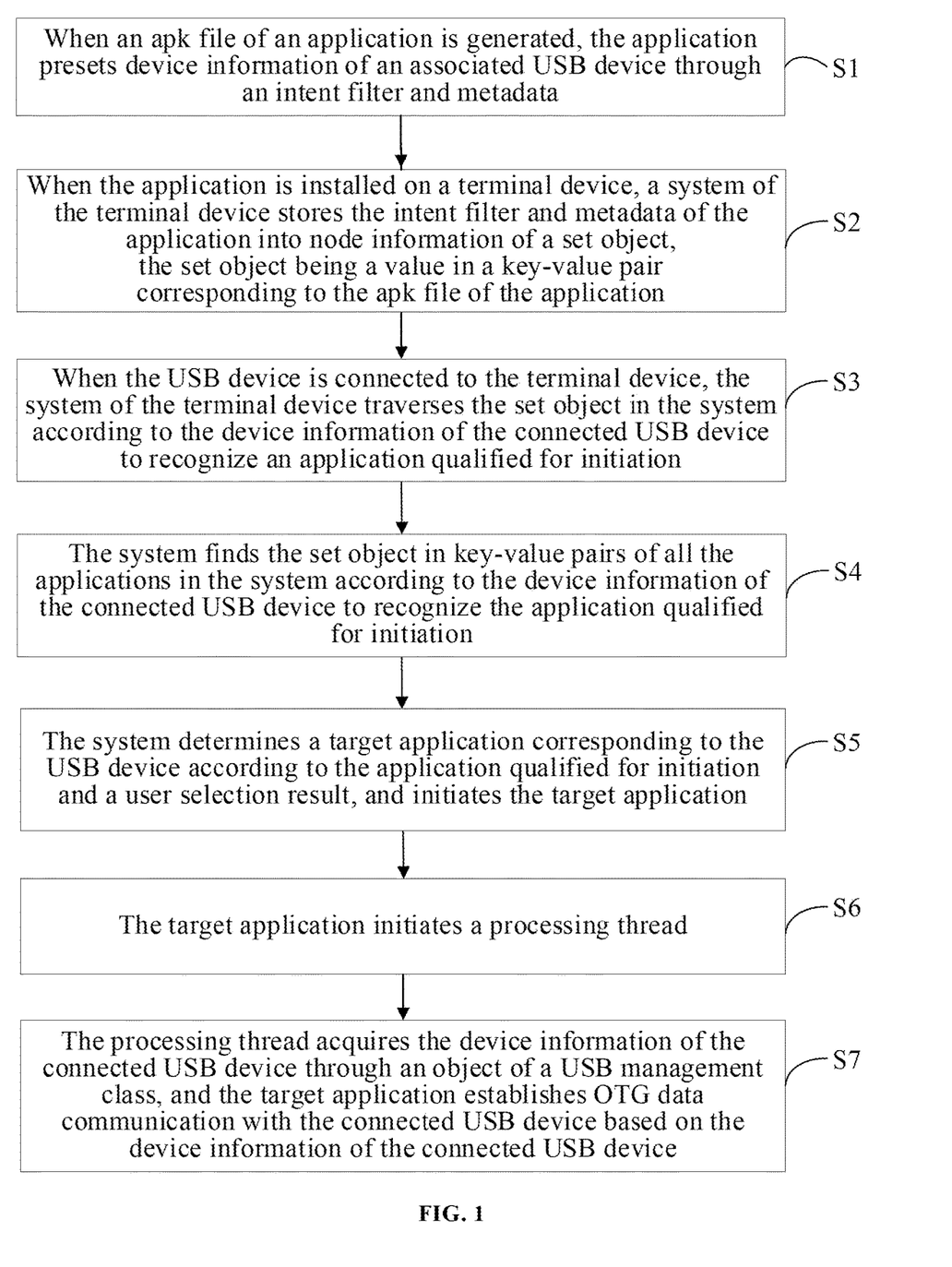
FIG. 1 is a flowchart of a method for realizing OTG communication without plugging and unplugging provided by the present disclosure.

A method for realizing OTG (on-the-go) communication without plugging and unplugging according to an embodiment of the present disclosure will now be described in detail with reference to FIG. 1, and the method for realizing OTG communication without plugging and unplugging includes the following steps:

S1, when an apk (Android application package) file of an application is generated, the application presets device information of an associated USB device through an intent filter and metadata.

Specifically, the device information of the USB device associated with the application is added to the metadata, wherein the device information includes a VID (vendor identification) and a PID (product identification).

Optionally, the device information may also include a USB device serial number.

S2, when the application is installed on a terminal device, a system of the terminal device stores the intent filter and metadata of the application into node information of a set object, the set object being a value in a key-value pair corresponding to the apk file of the application.

Specifically, the system stores the apk file of the application in a key-value pair manner, the key in the key-value pair being the application ID and the value in the key-value pair being the set object.

S3, when the USB device is connected to the terminal device, the system of the terminal device traverses the set object in the system according to the device information of the connected USB device to recognize an application qualified for initiation.

S4, the system finds the set object in key-value pairs of all the applications in the system according to the device information of the connected USB device to recognize the application qualified for initiation.

S5, the system determines a target application corresponding to the USB device according to the application qualified for initiation and a user selection result, and initiates the target application.

S6, the target application initiates a processing thread.

S7, the processing thread acquires the device information of the connected USB device through an object of a USB management class, and the target application establishes OTG data communication with the connected USB device based on the device information of the connected USB device.

Based on the above embodiment, further, the step S1 specifically includes:

the application creates an XML folder under a res catalog and creates an XML resource file under the XML folder, a usb-device sub-item is added to the XML resource file, and the device information of the associated USB device is added to the usb-device sub-item.

The application constructs the intent filter and specifies that an action attribute in the intent filter is USB device plugging.

The application constructs the metadata, a name of the metadata being USB device plugging, and a data resource of the metadata being the XML resource file.

If the action attribute of the intent filter is USB device plugging, and the noun of the metadata is USB device plugging, when the USB device is plugged, the intent filter filters an application that can be initiated when the USB device is plugged.

Based on the above embodiment, further, the step S4 specifically includes:

the system finds the set object in all key-value pairs in the system according to a vendor identification (VID) and a product identification (PID) in the device information to recognize the application qualified for initiation.

Further, the step S5 specifically includes:

when the number of the applications qualified for initiation is a first preset value, it is determined whether the application qualified for initiation uses the connected USB device by default.

If yes, the target application is taken as the application qualified for initiation.

Otherwise, a first user interface is popped up for a user to confirm whether to initiate the application qualified for initiation.

If the user selection result is to confirm the initiation of the application qualified for initiation, the application qualified for initiation is taken as the target application.

When the number of the applications qualified for initiation is greater than the first preset value, a second user interface is popped up for the user to select an application to be initiated, the second user interface including the application qualified for initiation, and the target application is determined according to the user selection result.

Further, the step S7 specifically includes:

S71, it is determined whether the device information of the connected USB device satisfies a preset condition.

S72, if yes, it is determined whether the connected USB device is authorized based on the device information of the USB device.

S73, if the connected USB device is authorized, an OTG data connection between the target application and the connected USB device is started to be established.

S74, if the target application successfully establishes the OTG data connection with the connected USB device, a success prompt is issued.

S75, if the target application fails to establish the OTG data connection with the connected USB device, a failure prompt is issued.

Further, the step S71 specifically includes:

it is determined whether the vendor identification (VID) belongs to a vendor identification in the preset condition; or it is determined whether the product identification (PID) belongs to a product identification in the preset condition; or it is determined whether the USB device serial number belongs to a USB device serial number in the preset condition; or it is determined whether the vendor identification (VID) belongs to the vendor identification in the preset condition, and whether the product identification (PID) belongs to the product identification in the preset condition; or it is determined whether the vendor identification (VID) belongs to the vendor identification in the preset condition, whether the product identification (PID) belongs to the product identification in the preset condition and whether the USB device serial number belongs to the USB device serial number in the preset condition.

If the device information of the connected USB device does not satisfy the preset condition, it is determined that the target application fails to establish the OTG data connection with the connected USB device.

Further, a step S76 is also included, specifically including:

if the device information of the connected USB device does not satisfy the preset condition, it is determined that the target application fails to establish the OTG data connection with the USB device.

Further, a step S77 is also included, specifically including:

S771, if the connected USB device is not authorized, an authority request for the connected USB device is made through the object of the USB management class and is broadcast through the system.

S772, the target application receives a usage authority broadcast of the target application through a broadcast receiver, and determines whether the connected USB device is authorized by the user.

S773, if the connected USB device is authorized, an OTG data connection between the target application and the connected USB device is started to be established.

S774, otherwise, it is determined that the target application fails to establish the OTG data connection with the connected USB device, and prompt information that the connected USB device requires authorization is issued.

Further, the step S773 specifically includes:

S7731, the number of USB device interfaces is obtained through the device information of the connected USB device.

S7732, if the number of USB device interfaces is greater than 0, the target application constructs a custom constant class, the custom constant class storing the device information through which a USB interface is acquired.

S7733, all USB endpoints under the USB interface are traversed, including determining the types of the USB endpoints and distinguishing the input and output directions, and USB endpoint information is stored through the custom constant class.

S7734, after the traversing is completed, a connection object of the USB device is obtained, and when the connection object of the USB device is not null, it is determined that the target application successfully establishes the OTG data connection with the USB device.

Further, a step S7735 is also included, specifically including:

if the number of USB device interfaces is equal to 0, it is determined that the target application fails to establish the OTG data connection with the connected USB device, and a connection failure prompt is issued.

Further, a step S7736 is also included, specifically including:

when the connection object of the USB device is null, it is determined that the target application fails to establish the OTG data connection with the connected USB device, and a connection failure prompt is issued.

The method for realizing OTG communication without plugging and unplugging according to an embodiment of the present disclosure realizes that after the USB device is plugged, the corresponding target application on the terminal device is initiated, and the terminal device and the USB device can directly perform OTG communication without the need of hardware connection of the USB device with the terminal device again, thereby avoiding the processing of manually selecting the target application, improving the initiation efficiency, and improving the usage feeling of the user.

Figure 2:
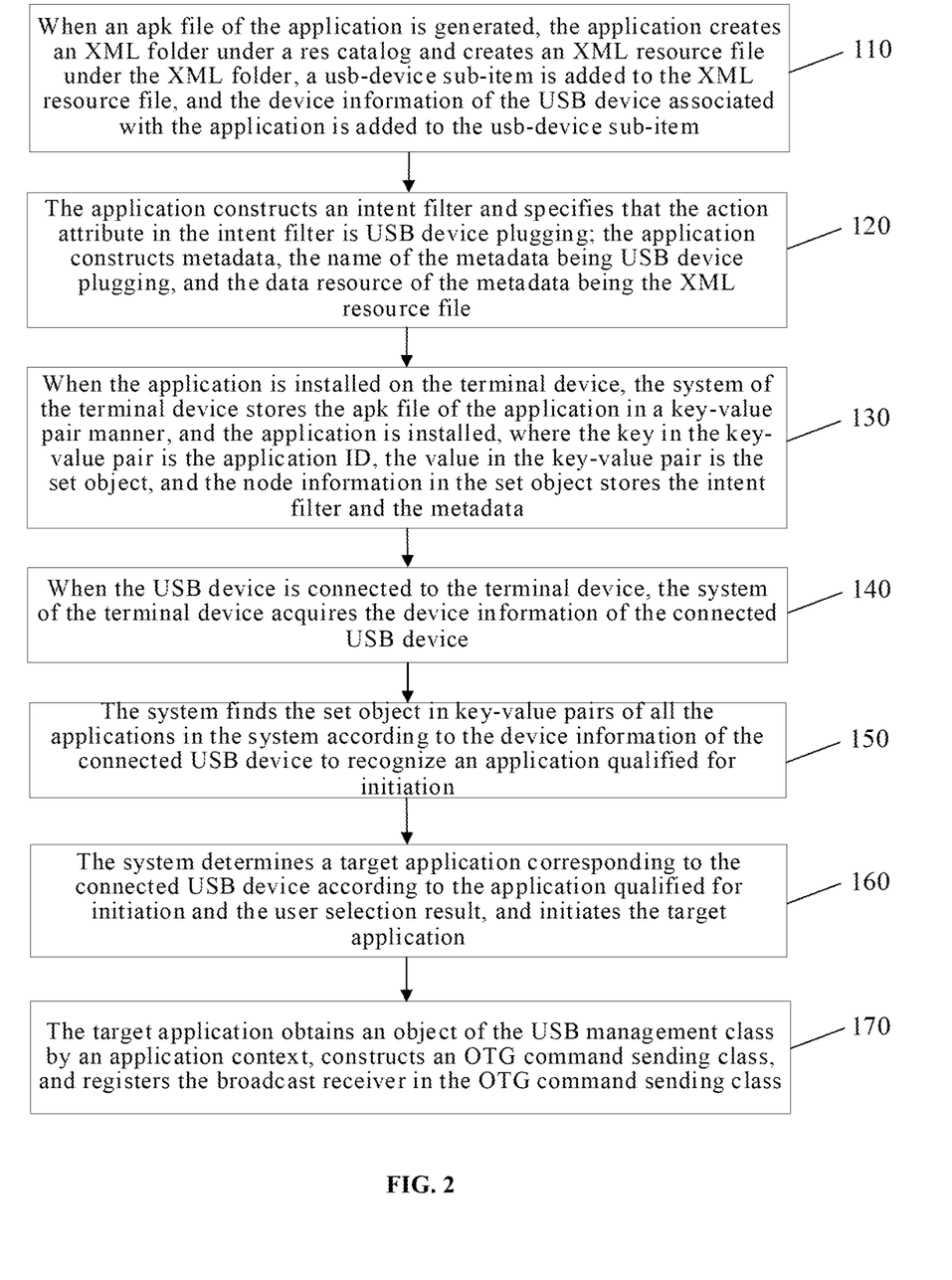
FIG. 2 is a processing flowchart of a possible implementation manner of the method for realizing OTG communication without plugging and unplugging provided by the present disclosure.
Figure 3:
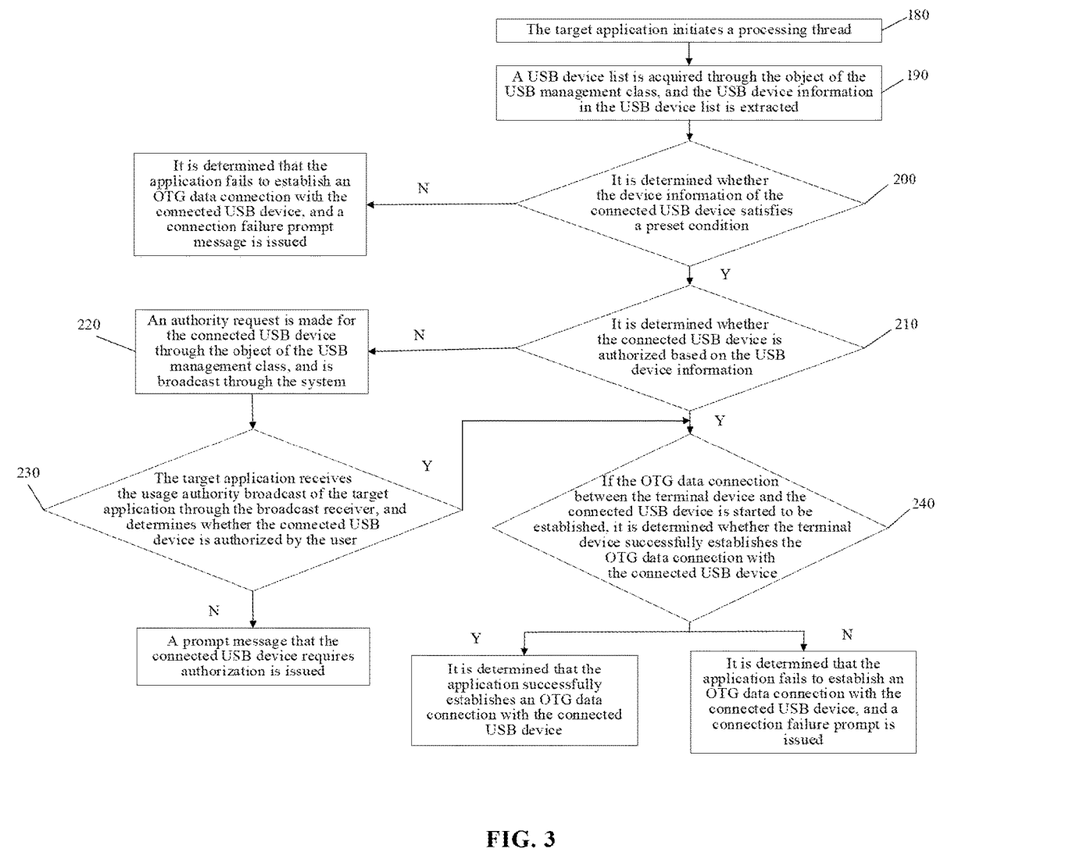
FIG. 3 is a processing flowchart of a possible implementation manner of the method for realizing OTG communication without plugging and unplugging provided by the present disclosure.

Based on the technical solution provided by the present disclosure described above, the technical solution is explained in detail below in a specific embodiment, as shown in FIGS. 2-3, which are specific processing flowcharts of a possible implementation manner of the method for realizing OTG communication without plugging and unplugging according to the present disclosure, in this embodiment, the terminal device is exemplified by a cellphone, a corresponding system is provided in the cellphone, and the access terminal is a USB flash disk, it should be noted that FIGS. 2-3 correspond to parts of the complete flowcharts of the embodiment, respectively.

110, when an apk file of the application is generated, the application creates an XML folder under a res catalog and creates an XML resource file under the XML folder, a usb-device sub-item is added to the XML resource file, and the device information of the USB device associated with the application is added to the usb-device sub-item.

In one possible implementation manner, device information is added to the usb-device sub-item according to the device information of the USB flash disk to be associated with the application, specifically, the device information includes a vendor identification (VID), a product identification (PID) and a USB device serial number.

120, the application constructs an intent filter and specifies that the action attribute in the intent filter is USB device plugging; the application constructs metadata, the name of the metadata being USB device plugging, and the data resource of the metadata being the XML resource file.

In one possible implementation manner, the application is packaged into an apk file after constructing the intent filter and the metadata.

130, when the application is installed on the terminal device, the system of the terminal device stores the apk file of the application in a key-value pair manner, and the application is installed, where the key in the key-value pair is the application ID, the value in the key-value pair is the set object, and the node information in the set object stores the intent filter and the metadata.

In one possible implementation manner, a plurality of key-value pairs are stored in the system, each key-value pair corresponds to an apk file of one application, and the device information of the USB device associated with the application is stored in the set object by the value in the key-value pair.

140, when the USB device is connected to the terminal device, the system of the terminal device acquires the device information of the connected USB device.

Specifically, the USB device is connected to one terminal device through an OTG data line. The device information that may be acquired is in the following format:

"vid, pid, serial number, class, sub-class, protocol, device-id, device-name, manufacturerName, productName, version" Device 1"2414 1811 6502100000000101 0 0 0 1002/dev/bus/usb/001/002, FS FT Interpass3000 1.16".

150, the system finds the set object in key-value pairs of all the applications in the system according to the device information of the connected USB device to recognize an application qualified for initiation.

Specifically, the system finds the set object in the key-value pairs of all the applications in the system according to the vendor identification (VID) and the product identification (PID) to obtain the application qualified for initiation.

Specifically, according to the above data, according to the VID being 2414 and the PID being 1811, the set object in the key-value pair of the application is found.

160, the system determines a target application corresponding to the connected USB device according to the application qualified for initiation and the user selection result, and initiates the target application.

Specifically, when there is only 1 application qualified for initiation, it is determined whether the application qualified for initiation is the application that the user has set to initiate by default.

If the application qualified for initiation is the application that the user has set to initiate by default, the application is initiated directly.

If the application qualified for initiation is the application that the user has not set to initiate by default, a first user interface is popped up for the user to confirm whether to initiate the application, and if the user confirms to initiate the application, the application is initiated.

When the number of the applications qualified for initiation is greater than 1, a second user interface is popped up for the user to select an application to be initiated, the second user interface including the application qualified for initiation, a target application to be initiated is recognized according to the user selection result, and the target application is initiated.

170, the target application obtains an object of the USB management class by an application context, constructs an OTG command sending class, and registers the broadcast receiver in the OTG command sending class.

Specifically, the target application also needs to determine whether the version of the system meets the preset version requirement, and if yes, the system method getSystemService is called through the application context of the target application and the "usb" string is passed in to obtain the USB management class, and the target application constructs the OTG command sending class.

An access terminal plugging and unplugging broadcast and a USB usage authority broadcast are received through the registered broadcast receiver in the OTG command sending class.

180, the target application initiates a processing thread.

190, a USB device list is acquired through the object of the USB management class, and the USB device information in the USB device list is extracted.

Specifically, "vid, pid, productName, version" Device 1"2414 1811 FT Interpass3000 1.16" is extracted from the above data; and 200, it is determined whether the device information of the connected USB device satisfies a preset condition.

Specifically, it is determined whether the vendor identification (VID) belongs to a vendor identification in the preset condition; or it is determined whether the product identification (PID) belongs to a product identification in the preset condition; or it is determined whether the USB device serial number belongs to a USB device serial number in the preset condition; or it is determined whether the vendor identification (VID) belongs to the vendor identification in the preset condition, and whether the product identification (PID) belongs to the product identification in the preset condition; or it is determined whether the vendor identification (VID) belongs to the vendor identification in the preset condition, whether the product identification (PID) belongs to the product identification in the preset condition and whether the USB device serial number belongs to the USB device serial number in the preset condition.

If the device information of the connected USB device satisfies the preset condition, step 210 is executed;
  otherwise, it is determined that the application fails to establish an OTG data connection with the connected USB device, and a connection failure prompt message is issued.

210, it is determined whether the connected USB device is authorized based on the USB device information.

If the connected USB device is authorized, an OTG data connection between the application and the connected USB device is started to be established, and step 240 is executed; and if the USB device is not authorized, step 220 is executed.

220, an authority request is made for the connected USB device through the object of the USB management class, and is broadcast through the system; and specifically, the system pops up an authority application window waiting for whether the user confirms authorization of the connected USB device.

230, the target application receives the usage authority broadcast of the target application through the broadcast receiver, and determines whether the connected USB device is authorized by the user; and if the connected USB device is authorized, step 240 is executed.

If the connected USB device is not authorized, a prompt message that the connected USB device requires authorization is issued.

240, if the OTG data connection between the terminal device and the connected USB device is started to be established, it is determined whether the terminal device successfully establishes the OTG data connection with the connected USB device.

Figure 4:
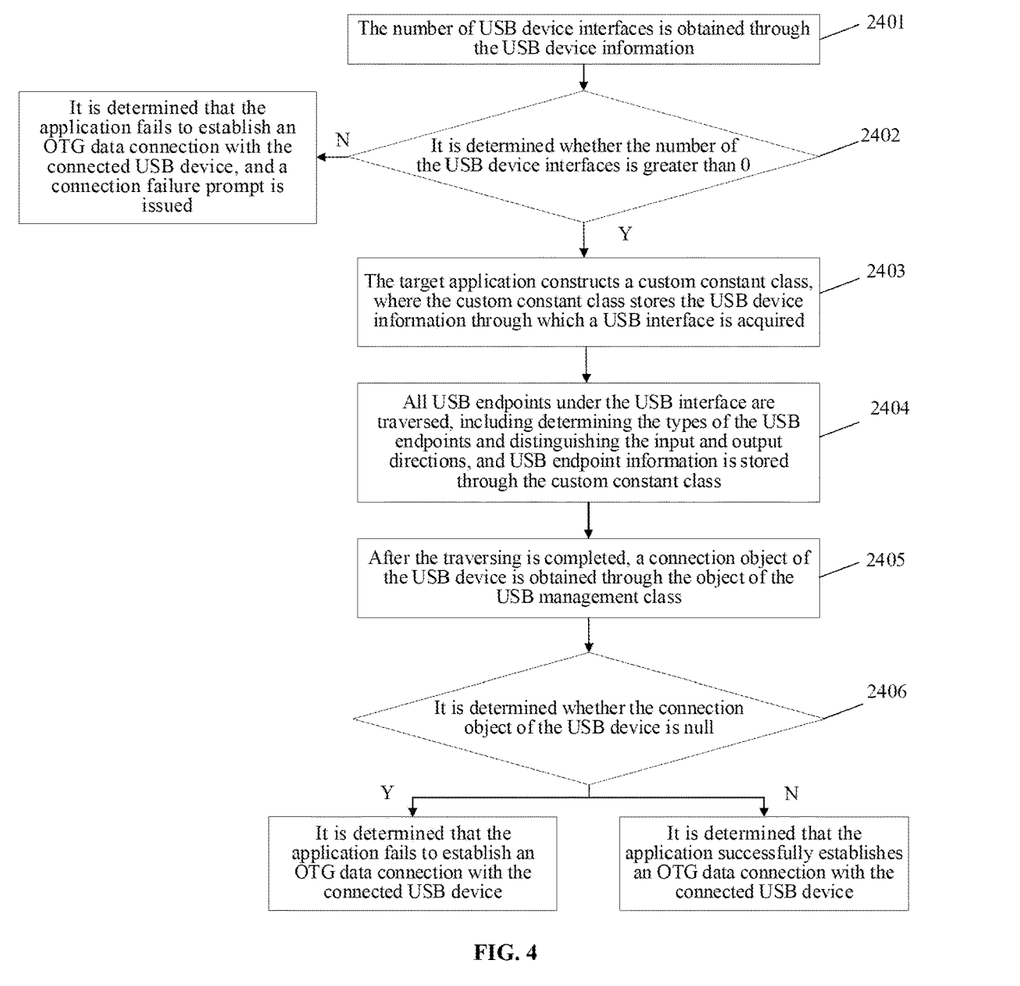
FIG. 4 is a processing flowchart of a specific implementation manner of the method for realizing OTG communication without plugging and unplugging provided by the present disclosure.

As shown in FIG. 4, step 240 includes:

2401, the number of USB device interfaces is obtained through the USB device information.

2402, it is determined whether the number of USB device interfaces is greater than 0.

If yes, step 2403 is executed.

Otherwise, it is determined that the application fails to establish an OTG data connection with the connected USB device, and a connection failure prompt is issued.

2403, the target application constructs a custom constant class, where the custom constant class stores the USB device information through which a USB interface is acquired.

2404, all USB endpoints under the USB interface are traversed, including determining the types of the USB endpoints and distinguishing the input and output directions, and USB endpoint information is stored through the custom constant class.

2405, after the traversing is completed, a connection object of the USB device is obtained through the object of the USB management class.

2406, it is determined whether the connection object of the USB device is null.

If yes, it is determined that the application fails to establish an OTG data connection with the connected USB device.

Otherwise, it is determined that the application successfully establishes an OTG data connection with the connected USB device.

The method for realizing OTG communication without plugging and unplugging provided by the present disclosure realizes that after the USB device is plugged, the corresponding target application on the terminal device is initiated, and the terminal device and the USB device can directly perform OTG communication without the need of hardware connection of the USB device with the terminal device again, thereby avoiding the processing of manually selecting the target application, improving the initiation efficiency, and improving the usage feeling of the user.

Figure 5:
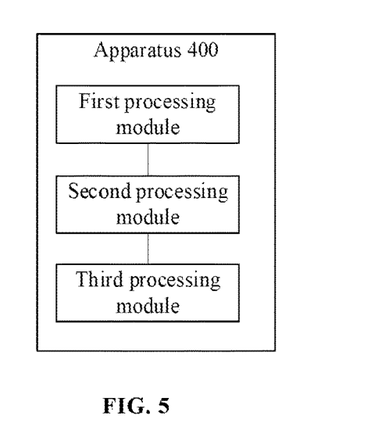
FIG. 5 is a structural diagram of an apparatus for realizing OTG communication without plugging and unplugging provided by the present disclosure.

According to the above technical solution for realizing OTG communication without plugging and unplugging of the present disclosure, the present disclosure correspondingly provides a structural diagram of an apparatus for realizing OTG communication without plugging and unplugging, as shown in FIG. 5, the apparatus 400 for realizing OTG communication without plugging and unplugging of the present disclosure may include:

a first processing module, configured to, when an apk file of an application is generated, preset, by the application, device information of an associated USB device through an intent filter and metadata;

a second processing module, configured to, when the application is installed on a terminal device, store, by a system of the terminal device, the intent filter and metadata of the application into node information of a set object, the set object being a value in a key-value pair corresponding to the apk file of the application, and when the USB device is connected to the terminal device, traverse, by the system of the terminal device, the set object in the system according to the device information of the USB device to recognize an application qualified for initiation, determine a target application corresponding to the USB device according to the application qualified for initiation and a user selection result, and initiate the target application; and a third processing module, configured to, after the target application is initiated, initiate a processing thread, acquire, by the processing thread, the device information of the connected USB device through an object of a USB management class, and establish OTG data communication between the target application and the connected USB device based on the device information of the connected USB device.

In one possible implementation manner, the first processing module is specifically configured to:

create, by the application, an XML folder under a res catalog and create an XML resource file under the XML folder, add a usb-device sub-item to the XML resource file, and add the device information of the associated USB device to the usb-device sub-item;

construct, by the application, the intent filter and specify that an action attribute in the intent filter is USB device plugging; and construct, by the application, the metadata, a name of the metadata being USB device plugging, and a data resource of the metadata being the XML resource file.

In one possible implementation manner, the second processing module is specifically configured to find, by the system, the set object in all key-value pairs in the system according to a vendor identification (VID) and a product identification (PID) in the device information to recognize an application qualified for initiation.

In one possible implementation manner, the second processing module is specifically configured to, when the number of the applications qualified for initiation is a first preset value, determine whether the application qualified for initiation uses the connected USB device by default;

if yes, the target application is taken as the application qualified for initiation;

otherwise, pop up a first user interface for a user to confirm whether to initiate the application qualified for initiation;

if the user selection result is to confirm the initiation of the application qualified for initiation, the application qualified for initiation is taken as the target application; and when the number of the applications qualified for initiation is greater than the first preset value, pop up a second user interface for the user to select an application to be initiated, the second user interface including the application qualified for initiation, and determine the target application according to the user selection result.

In one possible implementation manner, the third processing module is specifically configured to determine whether the device information of the connected USB device satisfies a preset condition;
   if yes, determine whether the connected USB device is authorized based on the device information;
   if the connected USB device is authorized, start to establish an OTG data connection between the target application and the connected USB device;
   if the target application successfully establishes the OTG data connection with the connected USB device, issue a success prompt; and
   if the target application fails to establish the OTG data connection with the connected USB device, issue a failure prompt.

In one possible implementation manner, the third processing module is specifically configured to determine whether the vendor identification (VID) belongs to a vendor identification in the preset condition; or, determine whether the product identification (PID) belongs to a product identification in the preset condition; or, determine whether a USB device serial number belongs to a USB device serial number in the preset condition; or, determine whether the vendor identification (VID) belongs to the vendor identification in the preset condition, and whether the product identification (PID) belongs to the product identification in the preset condition; or, determine whether the vendor identification (VID) belongs to the vendor identification in the preset condition, whether the product identification (PID) belongs to the product identification in the preset condition and whether the USB device serial number belongs to the USB device serial number in the preset condition.

In one possible implementation manner, the third processing module is specifically configured to, if the device information of the connected USB device does not satisfy the preset condition, determine that the target application fails to establish the OTG data connection with the connected USB device.

In one possible implementation manner, the third processing module is specifically configured to, if the connected USB device is not authorized, make an authority request for the connected USB device through the object of the USB management class and broadcast the authority request through the system;
   receive, by the target application, a usage authority broadcast of the target application through the broadcast receiver, and determine whether the connected USB device is authorized by the user; and
   if the connected USB device is authorized, an OTG data connection between the target application and the connected USB device is started to be established; and
   otherwise, determine that the target application fails to establish the OTG data connection with the connected USB device, and issue prompt information that authorization is required.

In one possible implementation manner, the third processing module is specifically configured to obtain the number of USB device interfaces through the device information of the connected USB device;
   if the number of the USB device interfaces is greater than 0, construct, by the target application, a custom constant class, the custom constant class storing the device information through which a USB interface is acquired;
   traverse all USB endpoints under the USB interface, including determining the types of the USB endpoints and distinguishing the input and output directions, and store USB endpoint information through the custom constant class; and
   after the traversing is completed, obtain a connection object of the USB device, and when the connection object of the USB device is not null, determine that the target application successfully establishes the OTG data connection with the connected USB device.

In one possible implementation manner, the third processing module is configured to, if the number of the USB device interfaces is equal to 0, determine that the target application fails to establish the OTG data connection with the connected USB device, and issue a connection failure prompt.

In one possible implementation manner, the third processing module is specifically configured to, when the connection object of the USB device is null, determine that the target application fails to establish the OTG data connection with the connected USB device, and issue a connection failure prompt.

The apparatus for realizing OTG communication without plugging and unplugging provided by the present disclosure realizes that after the USB device is plugged, the corresponding target application on the terminal device is initiated, and the terminal device and the USB device can directly perform OTG communication without the need of hardware connection of the USB device with the terminal device again, thereby avoiding the processing of manually selecting the target application, improving the initiation efficiency, and improving the usage feeling of the user.

The terminal devices may include but are not limited to a mobile terminal such as a mobile phone, a notebook computer, a digital broadcast receiver, a Personal Digital Assistant (PDA), a tablet computer (PAD), a Portable Multimedia Player (PMP), a vehicle mounted terminal (i.e. a vehicle mounted navigation terminal), etc., and a fixed terminal such as a digital TV, a desktop computer, or the like.

The terminal device 500 can include a processing device (for example, a central processing unit, a graphic processing unit, and the like) 501 which can execute proper operation and process according to the program stored in read only memory (ROM) 502, or the program loaded to random access memory (RAM) 503 from the storage device 508. Various programs and data required for the operation of the terminal device 500 is also stored in RAM 503. The processing device 501, the ROM 502 and the RAM 503 are connected to each other via a bus 504. An input/output (I/O) interface 505 is also connected to the bus 504.

Generally, the following devices can be connected to the I/O interface 505, which include the input device 506 such as touching screen, touching panel, keyboard, camera, microphone, accelerometer, gyroscope, and the like, and the output device 507 such as liquid crystal display (LCD), speaker, oscillator, and the like, the storage device 508 such as tape, hard disk, and the like, and a communicating device 509. The communicating device 509 can permit the electronic device 500 to perform wireless and wire communication with other devices to exchange data.

Specifically, according to the embodiments of the present disclosure, the process described above with reference to the flowchart can be implemented as a computer software program. For example, the embodiment of the present disclosure can include a computer program product, which includes a computer program carried on a computer-readable medium, and the computer program includes program code for executing the method shown in the flowchart. In such an embodiment, the computer program may be downloaded and installed from the network through the communication device 509, or installed from the storage device 508, or installed from the ROM 502. When the computer program is executed by the processing device 501, it executes the above-mentioned functions defined in the method of the embodiment of the present disclosure.

It should be noted that the above-mentioned computer-readable medium in this disclosure may be a computer-readable signal medium or a computer-readable storage medium, or any combination of the two. The computer-readable storage medium may be, for example, but not limited to, an electrical, magnetic, optical, electromagnetic, infrared, or semiconductor system, device, or device, or a combination of any of the above. More specific examples of computer-readable storage media may include, but are not limited to: electrical connections with one or more wires, portable computer disks, hard disks, random access memory (RAM), read-only memory (ROM), erasable Programmable read-only memory (EPROM or flash memory), optical fiber, portable compact disk read-only memory (CD-ROM), optical storage device, magnetic storage device, or any suitable combination of the above. In this disclosure, the computer-readable storage medium may be any tangible medium that contains or stores a program, and the program may be used by or in combination with an instruction execution system, apparatus, or device. In this disclosure, the computer-readable signal medium may include a data signal propagated in baseband or as a part of a carrier wave, and computer-readable program code is carried therein. This propagated data signal can take many forms, including but not limited to electromagnetic signals, optical signals, or any suitable combination of the foregoing. The computer-readable signal medium may also be any computer-readable medium other than the computer-readable storage medium. The computer-readable signal medium may send, propagate, or transmit the program for use by or in combination with the instruction execution system, apparatus, or device. The program code contained on the computer-readable medium can be transmitted by any suitable medium, including but not limited to: wire, optical cable, RF (Radio Frequency), etc., or any suitable combination of the above.

The above-mentioned computer-readable medium may be included in the above-mentioned electronic device; or it may exist alone without being assembled into the electronic device.

The computer program code used to perform the operations of this disclosure can be written in one or more programming languages or a combination thereof. The above-mentioned programming languages include object-oriented programming languages—such as Java, Smalltalk, C++, and also conventional Procedural programming language-such as "C" language or similar programming language. The program code can be executed entirely on the user's computer, partly on the user's computer, executed as an independent software package, partly on the user's computer and partly executed on a remote computer, or entirely executed on the remote computer or server. In the case of a remote computer, the remote computer can be connected to the user's computer through any kind of network, including a local area network (LAN) or a wide area network (WAN), or it can be connected to an external computer (for example, using an Internet service provider to pass Internet connection).

The flowcharts and block diagrams in the accompanying drawings illustrate the possible implementation manners of the system architecture, functions, and operations of the system, method, and computer program product according to various embodiments of the present disclosure. In this regard, each block in the flowchart or block diagram may represent a module, program segment, or part of code, and the module, program segment, or part of code contains one or more executable instructions for realizing the specified logic function. It should also be noted that, in some alternative implementation manners, the functions marked in the block may also occur in a different order from the order marked in the drawings. For example, two blocks shown in succession can actually be executed substantially in parallel, and they can sometimes be executed in the reverse order, depending on the functions involved. It should also be noted that each block in the block diagram and/or flowchart, and the combination of the blocks in the block diagram and/or flowchart, can be implemented by a dedicated hardware-based system that performs the specified functions or operations or it can be realized by a combination of dedicated hardware and computer instructions.

The units involved in the embodiments described in this disclosure can be implemented in software or hardware. Wherein, the name of the unit does not constitute a limitation on the unit itself under certain circumstances.

The above description is only a preferred embodiment of the present disclosure and an explanation of the applied technical principles. Those skilled in the art should understand that the scope of disclosure involved in this disclosure is not limited to the technical solutions formed by the specific combination of the above technical features, and should also cover other technical solutions formed by arbitrarily combining the above technical features or the equivalent features thereof without departing from the above disclosed concept, such as technical solutions formed by mutually replacing the above-mentioned features and the technical features disclosed in this disclosure (but not limited to) with similar functions.

The terminal device provided in this disclosure is applicable to any embodiment of the aforementioned method for realizing OTG communication without plugging and unplugging, and will not be repeated here.

In the present disclosure, by the above solutions, it is achieved that after the USB device is plugged, the corresponding target application on the terminal device is initiated, and the terminal device and the USB device can directly perform OTG communication without the need of hardware connection of the USB device with the terminal device again, thereby avoiding the processing of manually selecting the target application, improving the initiation efficiency, and improving the usage feeling of the user.

The present disclosure provides a computer-readable storage medium, which stores the computer program, and the computer program enables a computer to execute the method for realizing OTG communication without plugging and unplugging shown in the above-mentioned embodiments.

In the present disclosure, by the above solutions, it is achieved that after the USB device is plugged, the corresponding target application on the terminal device is initiated, and the terminal device and the USB device can directly perform OTG communication without the need of hardware connection of the USB device with the terminal device again, thereby avoiding the processing of manually selecting the target application, improving the initiation efficiency, and improving the usage feeling of the user.

Those skilled in the art can understand that computer program instructions can be used to implement each block in these structural diagrams and/or block diagrams and/or flowcharts and combinations of blocks in these structural diagrams and/or block diagrams and/or flowcharts. Those skilled in the art can understand that these computer program instructions can be provided to processors of general-purpose computers, professional computers, or other programmable data processing methods for implementation, so that the computer or other programmable data processing method processors can execute the structure diagram and/or block diagram and/or flowchart disclosed in the disclosure or the schemes specified in multiple boxes.

Among them, the various modules of the device of the present disclosure can be integrated or deployed separately. The above-mentioned modules can be combined into one module or further divided into multiple sub-modules.

Those skilled in the art can understand that the accompanying drawings are only schematic diagrams of a preferred embodiment, and the modules or processes in the accompanying drawings are not necessarily necessary for implementing this disclosure.

Those skilled in the art can understand that the modules in the device in the embodiment can be distributed in the device in the embodiment according to the description of the embodiment, or can be changed to be located in one or more devices different from this embodiment. The modules in the above-mentioned embodiments can be combined into one module or further divided into multiple sub-modules.

The above serial number of this disclosure is for description only, and does not represent the advantages and disadvantages of the embodiments.

The above disclosures are only a few specific embodiments of the disclosure, but the disclosure is not limited to them, and any changes that can be thought of by those skilled in the art should fall into the protection scope of the disclosure.

++++

The invention claimed is:

1. A method for realizing On-The-Go (OTG) communication without plugging and unplugging, wherein the method comprises:
 when an Android Application Package (APK) file of an application is generated, presetting, by the application, device information of an associated Universal Serial Bus (USB) device through an intent filter and metadata;
 when the application is installed on a terminal device, storing, by a system of the terminal device, the intent filter and metadata of the application into node information of a set object, in which the set object is a value in a key-value pair corresponding to the apk file of the application; when the USB device is connected to the terminal device, traversing, by the system of the terminal device, the set object in the system according to the device information of the USB device to recognize an application qualified for initiation;
 determining a target application corresponding to the USB device according to the application qualified for initiation and a user selection result, and initiating the target application; and
 after the target application is initiated, initiating a processing thread; acquiring, by the processing thread, the device information of the connected USB device through an object of a USB management class; and establishing OTG data communication between the target application and the connected USB device based on the device information of the connected USB device.

2. The method according to claim 1, wherein the presetting, by the application, the device information of the associated USB device through the intent filter and the metadata specifically comprises:
 creating, by the application, an Extensible Markup Language (XML) folder under a resource (res) catalog and creating an XML resource file under the XML folder, adding a usb-device sub-item to the XML resource file, and adding the device information of the associated USB device to the usb-device sub-item;
 constructing, by the application, the intent filter and specifying that an action attribute in the intent filter is USB device plugging; and
 constructing, by the application, the metadata, in which a name of the metadata is USB device plugging, and a data resource of the metadata is the XML resource file.

3. The method according to claim 1, wherein the traversing, by the system of the terminal device, the set object in the system according to the device information of the USB device to recognize the application qualified for initiation specifically comprises:
 finding, by the system, the set object in all key-value pairs in the system according to a vendor identification (VID) and a product identification (PID) in the device information to recognize the application qualified for initiation.

4. The method according to claim 1, wherein the determining the target application corresponding to the USB device according to the application qualified for initiation and the user selection result specifically comprises:
 when the number of the application qualified for initiation is a first preset value, determining whether the application qualified for initiation uses the connected USB device by default;
 if yes, taking the target application as the application qualified for initiation;
 otherwise, popping up a first user interface for a user to confirm whether to initiate the application qualified for initiation;
 if the user selection result is to confirm the initiation of the application qualified for initiation, taking the application qualified for initiation as the target application; and
 when the number of the application qualified for initiation is greater than the first preset value, popping up a second user interface for a user to select an application to be initiated, in which the second user interface comprises the application qualified for initiation, and determining the target application according to the user selection result.

5. The method according to claim 1, wherein the establishing OTG data communication between the target application and the connected USB device based on the device information of the connected USB device specifically comprises:
 determining whether the device information of the connected USB device satisfies a preset condition;
 if yes, determining whether the connected USB device is authorized based on the device information;
 if the connected USB device is authorized, starting to establish an OTG data connection between the target application and the connected USB device;
 if the target application successfully establishes the OTG data connection with the connected USB device, issuing a success prompt; and if the target application fails to establish the OTG data connection with the connected USB device, issuing a failure prompt.

6. The method according to claim 5, wherein the determining whether the device information of the connected USB device satisfies the preset condition specifically comprises:
  determining whether the vendor identification (VID) belongs to a vendor identification in the preset condition; or,
  determining whether the product identification (PID) belongs to a product identification in the preset condition; or,
  determining whether a USB device serial number belongs to a USB device serial number in the preset condition; or,
  determining whether the vendor identification (VID) belongs to the vendor identification in the preset condition, and whether the product identification (PID) belongs to the product identification in the preset condition; or,
  determining whether the vendor identification (VID) belongs to the vendor identification in the preset condition, whether the product identification (PID) belongs to the product identification in the preset condition and whether the USB device serial number belongs to the USB device serial number in the preset condition.

7. The method according to claim 5, wherein the method further comprises:
  if the device information of the connected USB device does not satisfy the preset condition, determining that the target application fails to establish the OTG data connection with the connected USB device.

8. The method according to claim 5, wherein the method further comprises:
  if the connected USB device is not authorized, making an authority request for the connected USB device through the object of the USB management class and broadcasting the authority request through the system;
  receiving, by the target application, a usage authority broadcast of the target application through a broadcast receiver, and determining whether the connected USB device is authorized by the user; and
  if the connected USB device is authorized, starting to establish the OTG data connection between the target application and the connected USB device; and
  otherwise, determining that the target application fails to establish the OTG data connection with the connected USB device, and issuing prompt information that authorization is required.

9. The method according to claim 5, wherein the starting to establish the OTG data connection between the target application and the connected USB device specifically comprises:
  obtaining the number of USB device interfaces through the device information of the connected USB device;
  if the number of the USB device interfaces is greater than 0, constructing, by the target application, a custom constant class, in which the custom constant class stores the device information through which a USB interface is acquired;
  traversing all USB endpoints under the USB interface for acquiring USB endpoint information, and storing the USB endpoint information through the custom constant class; and
  after the traversing is completed, obtaining a connection object of the USB device, and when the connection object of the USB device is not null, determining that the target application successfully establishes the OTG data connection with the connected USB device.

10. The method according to claim 9, wherein the method further comprises:
  if the number of the USB device interfaces is equal to 0, determining that the target application fails to establish the OTG data connection with the connected USB device, and issuing a connection failure prompt.

11. The method according to claim 9, wherein the method further comprises:
  when the connection object of the USB device is null, determining that the target application fails to establish the OTG data connection with the connected USB device, and issuing a connection failure prompt.

12. A terminal device, wherein the terminal device comprises: a processor, a memory, and a computer-readable storage medium;
  the memory is configured to store a computer program;
  the processor is configured to perform the method for realizing OTG communication without plugging and unplugging according to claim 1 by calling the computer program; and
  the computer-readable storage medium is configured to store the computer program which, when running on a computer, enables the computer to perform the method for realizing OTG communication without plugging and unplugging according to claim 1.

* * * * *